(12) United States Patent
Iritsuki et al.

(10) Patent No.: US 9,825,313 B2
(45) Date of Patent: Nov. 21, 2017

(54) FUEL CELL STACK WITH DISPLACEMENT ABSORBING MEMBER

(71) Applicant: NISSAN MOTOR CO., LTD., Yokohama-shi, Kanagawa (JP)

(72) Inventors: Keita Iritsuki, Kanagawa (JP); Yosuke Fukuyama, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 378 days.

(21) Appl. No.: 14/397,339

(22) PCT Filed: Dec. 26, 2012

(86) PCT No.: PCT/JP2012/083628
§ 371 (c)(1),
(2) Date: Oct. 27, 2014

(87) PCT Pub. No.: WO2013/175669
PCT Pub. Date: Nov. 28, 2013

(65) Prior Publication Data
US 2015/0079488 A1    Mar. 19, 2015

(30) Foreign Application Priority Data

May 23, 2012  (JP) .................................. 2012-117779
Nov. 22, 2012  (JP) .................................. 2012-255850

(51) Int. Cl.
*H01M 8/04* (2016.01)
*H01M 8/02* (2016.01)
(Continued)

(52) U.S. Cl.
CPC ..... *H01M 8/04007* (2013.01); *H01M 8/0258* (2013.01); *H01M 8/0267* (2013.01);
(Continued)

(58) Field of Classification Search
CPC ........ H01M 8/02; H01M 8/04; H01M 8/0267; H01M 8/04007; H01M 8/2465; H01M 8/248
See application file for complete search history.

(56) References Cited

U.S. PATENT DOCUMENTS

2005/0106444 A1*  5/2005  Yamauchi ........... H01M 8/0206
                                                         429/434
2009/0136805 A1   5/2009  Sato et al.
2010/0015505 A1*  1/2010  Miller ................. H01M 8/0258
                                                         429/492

FOREIGN PATENT DOCUMENTS

JP     2006318863 A  * 11/2006
JP       4432518 B2    3/2010
(Continued)

OTHER PUBLICATIONS

Machine Translation of: JP 2006/318863 A, Sato et al., Nov. 24, 2006.*

*Primary Examiner* — Kenneth J Douyette
(74) *Attorney, Agent, or Firm* — Young Basile Hanlon & MacFarlane, P.C.

(57) ABSTRACT

A fuel cell stack has a plurality of laminated cell units, with each of the cell units including a membrane electrode assembly sandwiched between two separators, and cooling fluid passage channels are formed between each adjacent cell units for flowing cooling fluid. Displacement absorbing members have a plurality of displacement absorbing projections that absorb displacement along a laminated direction of the cell unit and are provided in the cooling fluid passage channels. The displacement absorbing projections of the displacement absorbing members are disposed so as to cancel out any bending moments generated on the cell unit.

13 Claims, 13 Drawing Sheets

(51) Int. Cl.
    *H01M 8/24*       (2016.01)
    *H01M 8/04007*    (2016.01)
    *H01M 8/0258*     (2016.01)
    *H01M 8/2465*     (2016.01)
    *H01M 8/0267*     (2016.01)
    *H01M 8/248*      (2016.01)

(52) U.S. Cl.
    CPC ......... *H01M 8/248* (2013.01); *H01M 8/2465* (2013.01); *H01M 2250/20* (2013.01)

(56) References Cited

FOREIGN PATENT DOCUMENTS

| | | |
|---|---|---|
| JP | 2012059383 A | 3/2012 |
| JP | 2012129108 A | 7/2012 |

\* cited by examiner

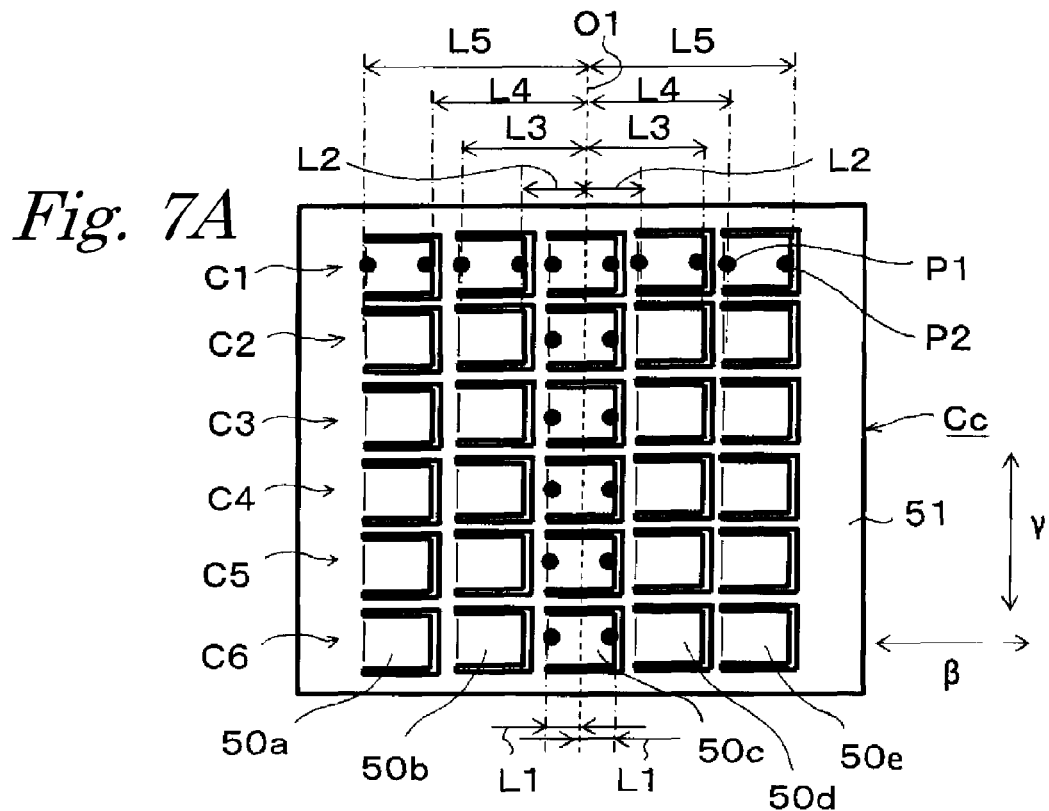
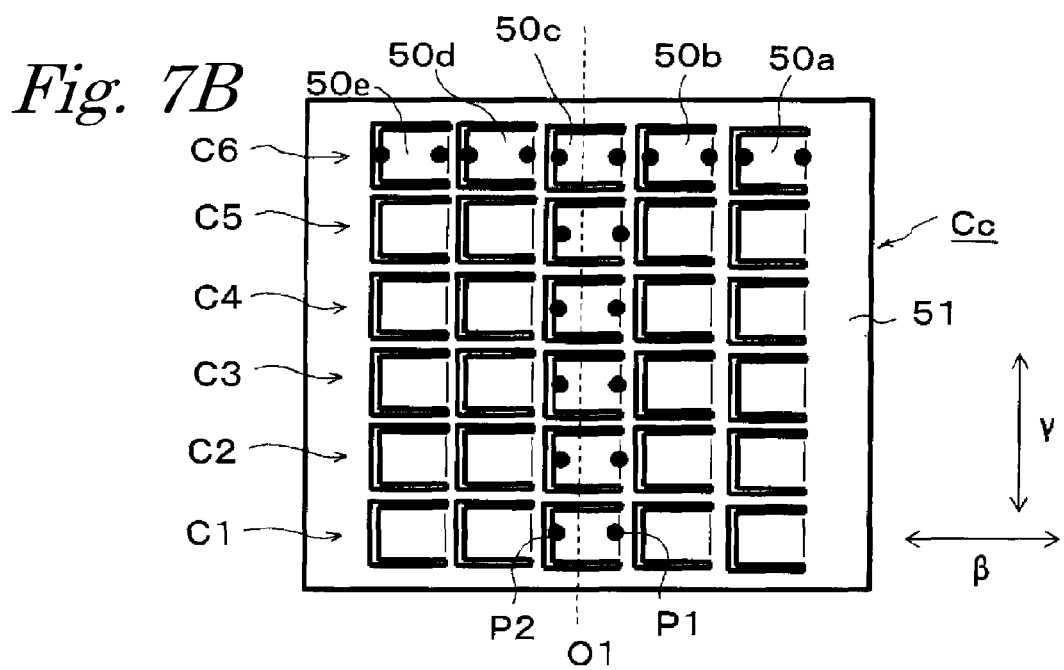

FUEL CELL STACK WITH DISPLACEMENT ABSORBING MEMBER

CROSS REFERENCE TO RELATED APPLICATIONS

The present application claims priority to Japanese Patent Application Nos. 2012-117779, filed May 23, 2012, and 2012-255850, filed Nov. 22, 20112, each incorporated herein in its entirety.

TECHNICAL FIELD

The present invention relates to a fuel cell stack formed by laminating cell units.

BACKGROUND

As one of these types of cell units, a single cell of a fuel cell is disclosed in Japanese Patent No. 4432518. The single cell of a fuel cell disclosed in Japanese Patent No. 4432518 includes a membrane electrode assembly having a fuel gas channel and an oxidant gas channel formed of a concave-convex shape in a region contributing to power generation, a first separator disposed on one surface of the membrane electrode assembly, at least a surface of the first separator on the side of the disposition being flat, and a second separator disposed on the other surface of the membrane electrode assembly, at least a surface of the second separator on the side of the disposition being flat.

Moreover, the single cell of a fuel cell further includes a wave-plate cooling plate provided in contact with any one of the first separator and the second separator and having a refrigerant channel (cooling fluid passage channel) for allowing flow of a refrigerant, and a third separator disposed on the cooling plate.

SUMMARY

However, with the above conventional single cell of a fuel cell, in a case in which points on which load is applied on a cooling plate, which corresponds to a deformation absorbing member of the present invention, do not face each other between adjacent single cells of a fuel cell, a bending moment is generated on the entire single cell of a fuel cell, depending on the position of the point on which the load is applied on the cooling plate of the adjacent single cells of a fuel cell. This may increase the stress applied on the separator, which may damage the single cell of a fuel cell.

The present invention was accomplished in view of the above situation, and an object thereof is to provide a fuel cell stack that can prevent a bending moment from being generated on a cell unit even in a case in which a displacement absorbing member is provided in a cooling fluid passage channel.

A fuel cell stack of the present invention has a structure, in which a plurality of cell units are laminated, the cell unit including a membrane electrode assembly sandwiched between two separators; and a cooling fluid passage channel for allowing cooling fluid to flow between the respective adjacent cell units is formed.

The fuel cell stack further includes, in the cooling fluid passage channel, a displacement absorbing member having a plurality of displacement absorbing projections that absorb displacement of the cell units along a laminated direction, the displacement absorbing projections of the displacement absorbing member being disposed to cancel out any bending moments generated on the cell units. The above configuration serves as means for solving the above problem.

The fuel cell stack of the present invention can prevent the generation of a bending moment on a cell unit also in a case in which a displacement absorbing member is provided in the cooling fluid passage channel.

BRIEF DESCRIPTION OF DRAWINGS

FIG. 7(A) is a plan view of a displacement absorbing member according to a second embodiment, disposed in a cooling fluid passage channel on an anode separator side of the cell unit, and FIG. 7(B) is a plan view of a displacement absorbing member according to another example, disposed in a cooling fluid passage channel on a cathode separator side of the cell unit.

DESCRIPTION OF EMBODIMENTS

First Embodiment

Figure 1:
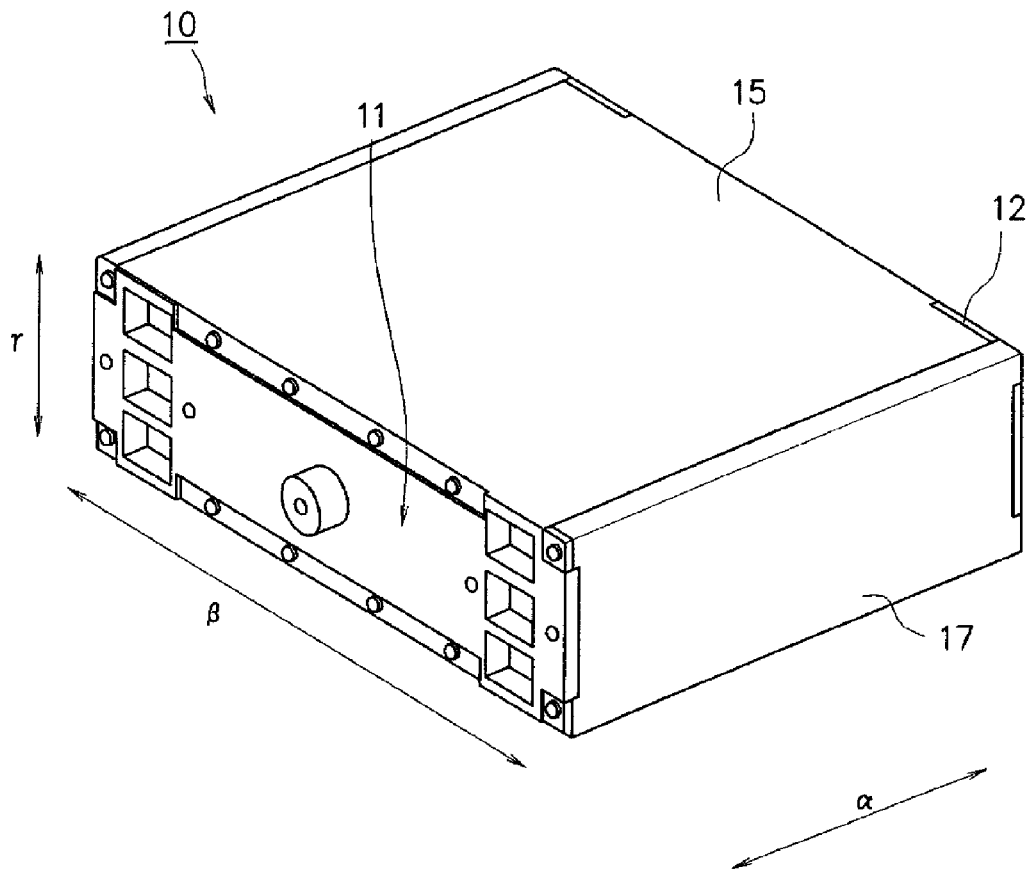
FIG. 1 is an external perspective view of a fuel cell stack according to one embodiment of the present invention.
Figure 2:
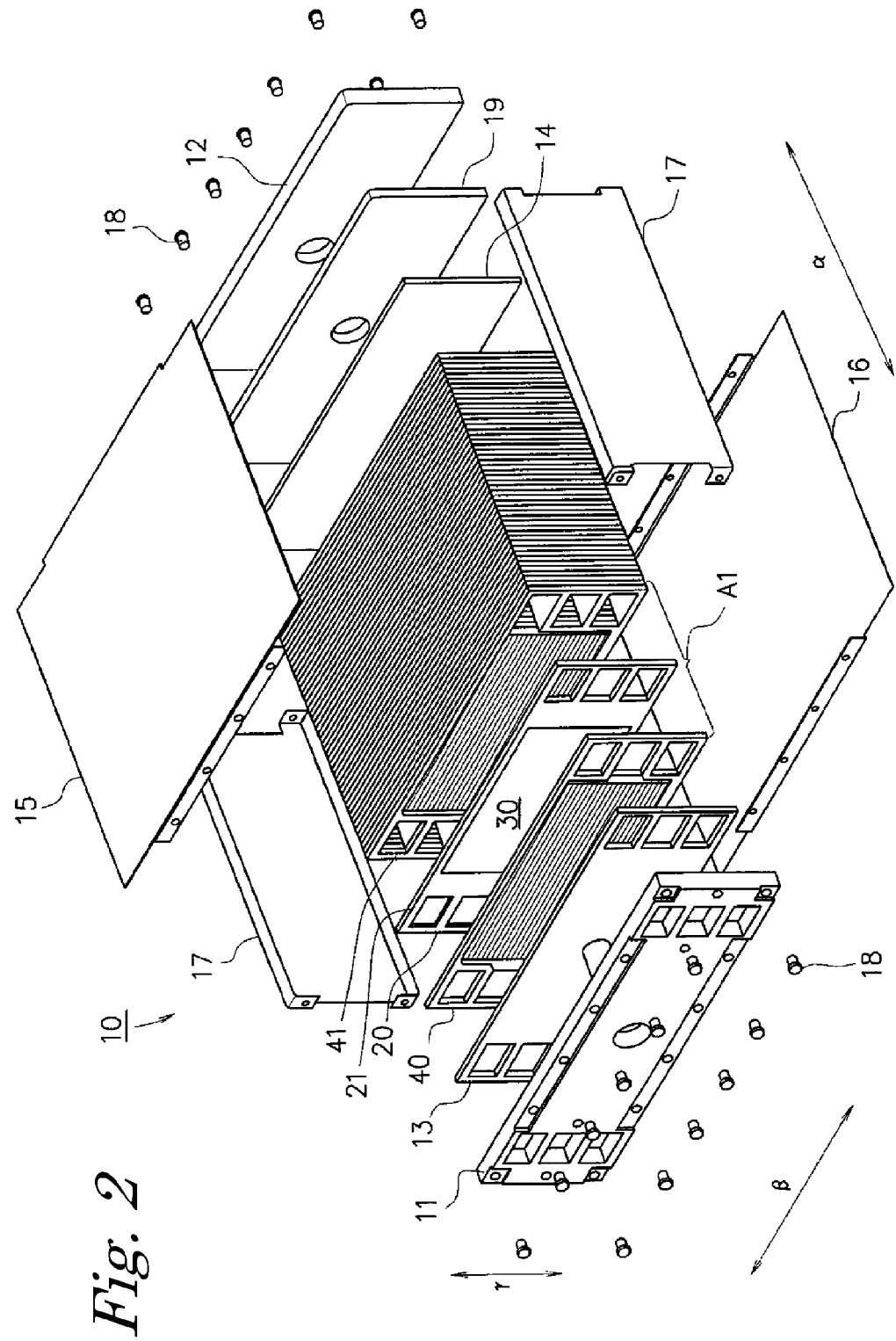
FIG. 2 is an exploded perspective view illustrating the fuel cell stack in an exploded manner.
Figure 3:
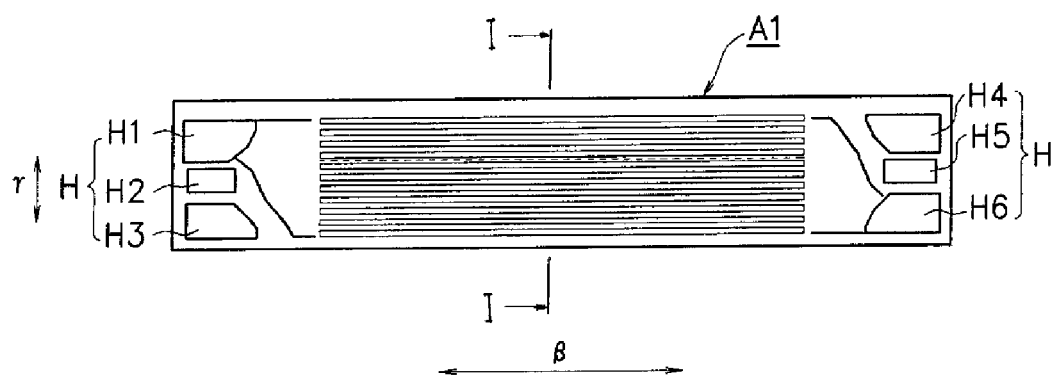
FIG. 3 is a plan view of a cell unit according to one example that constitutes a part of the fuel cell stack.
Figure 4:
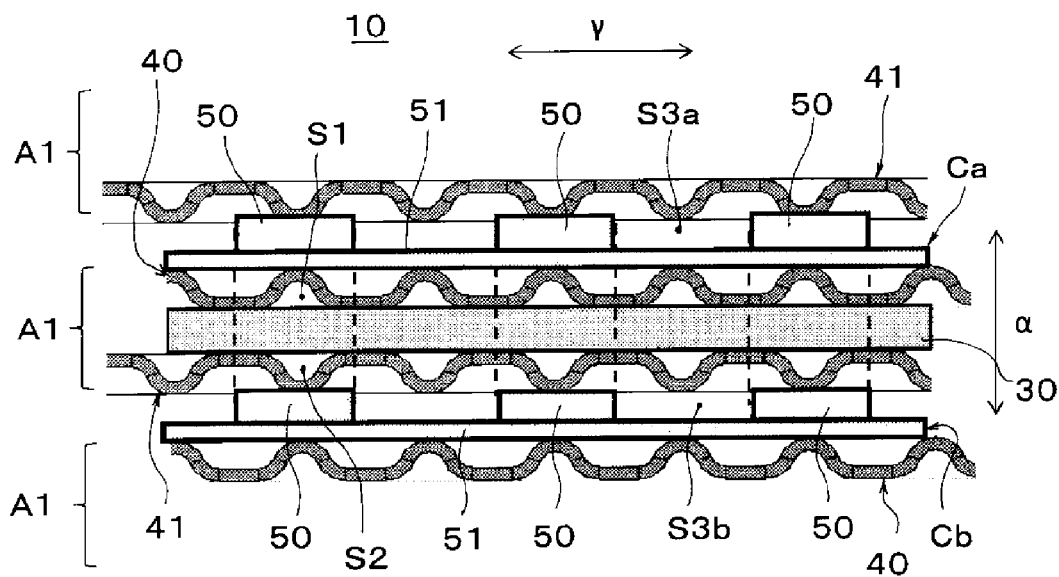
FIG. 4 is a partial enlarged cross sectional view of a laminate of a plurality of the cell units of FIG. 3, taken along line I-I.

Described below is an embodiment of the present invention with reference to the accompanied drawings. FIG. 1 is an external perspective view of a fuel cell stack according to one embodiment of the present invention, and FIG. 2 is an exploded perspective view illustrating the fuel cell stack in an exploded manner. FIG. 3 is a plan view of a cell unit included in the fuel cell stack, and FIG. 4 is a partial enlarged cross sectional view of a laminate of a plurality of the cell units illustrated in FIG. 3, taken along the line I-I.

A fuel cell stack 10 according to one embodiment of the present invention is of a polymer electrolyte type to be equipped in vehicles, for example. The fuel cell stack 10 illustrated in FIG. 1 and FIG. 2 has a case-integrated structure stacking current collectors 13 and 14 and a plurality of cell units A1 between a pair of end plates 11 and 12, and in which the plurality of the cell units A1 are pressed together by the end plates 11 and 12 and are bound by fastening plates 15 and 16 and reinforcement plates 17 and 17. In FIG. 2, the members referred to as reference sign 18 are bolts, and the member referred to as reference sign 19 is a spacer.

The cell unit A1 includes a membrane electrode assembly 30, and an anode separator 40 and a cathode separator 41 disposed on corresponding sides of the membrane electrode assembly 30. The separators demarcate gas passage channels S1 and S2 (see FIG. 4) for allowing separate power generation gases to flow through the respective channels. The power generation gas is hydrogen-containing gas and oxygen-containing gas.

The membrane electrode assembly 30 is the so-called MEA (Membrane Electrode Assembly), and for example has a structure of an electrolyte film made of solid polymer being sandwiched between an anode electrode and a cathode electrode (both not illustrated). The membrane electrode assembly 30 is disposed in a center part of a frame 20 made of resin (see FIG. 2).

The membrane electrode assembly 30 generates power by supplying to the anode electrode hydrogen-containing gas that flows through the gas passage channel S1 illustrated in FIG. 4 and supplying to the cathode electrode oxygen-containing gas that flows through the gas passage channel S2 illustrated in FIG. 4.

As illustrated in FIG. 3, a manifold section H is formed on either side of the cell unit A1, for supplying and exhausting hydrogen-containing gas or oxygen-containing gas. The manifold section H on one side includes manifold holes H1 to H3. The manifold holes H1 to H3 are provided for supplying oxygen-containing gas (H1), cooling fluid (H2) and hydrogen-containing gas (H3), and each channel is formed along a laminated direction α illustrated in FIG. 1, FIG. 2 and FIG. 4. The cooling fluid used in this embodiment is water; the cooling fluid is not limited to this however, and other cooling media may also be used.

The manifold section H on the other side includes manifold holes H4 to H6. The manifold holes H4 to H6 are provided for exhausting hydrogen-containing gas (H4), cooling fluid (H5) and oxygen-containing gas (H6), and each channel is formed along the laminated direction α illustrated in FIG. 1 and FIG. 2. The supplying and exhausting passages may be in opposite positional relationships either partially or entirely.

The frame 20 is integrated with the membrane electrode assembly 30 by injection molding for example, and in this embodiment, is shaped as a horizontally-long rectangle seen from a front view along the laminated direction α. The anode separator 40 and cathode separator 41 are metal plates made of stainless steel or the like, press formed into a wave form, and are shaped in substantially the same shape and same size as the frame 20. The separators 40 and 41 continuously have a cross section of a wave form in the longitudinal direction, and valley parts of the wave form provide the passage channels for the power generation gas and cooling fluid.

In the cell unit A1 including the above structure, the hydrogen-containing gas, oxygen-containing gas and cooling fluid flow from one side to the other side of the frame 20, or vice versa. That is to say, the power generation gas and the cooling fluid flow along a flowing direction β, which is the longitudinal direction of the cell unit A1.

The above membrane electrode assembly 30 and the anode separator 40 and cathode separator 41 fabricate the cell unit A1 by applying a sealing to peripheries thereof, to bond these members together liquid-tightly. As illustrated in FIG. 4, among the laminated three cell units A1, A1, A1, the anode separator 40 and cathode separator 41 of the middle cell unit A1 are bonded liquid-tightly with a cathode separator 41 of the illustrated upper cell unit A1 and an anode separator 40 of the illustrated lower cell unit A1, respectively, to form cooling fluid passage channels S3a and S3b for allowing the cooling fluid to flow between the respective separators.

Moreover, the manifolds H of each of the frame 20 and the anode separator 40 and cathode separator 41 are communicated together to form a communication hole for the power generation gas and a communication hole for the cooling fluid, along the laminated direction α of the cell unit A1.

Figure 5:
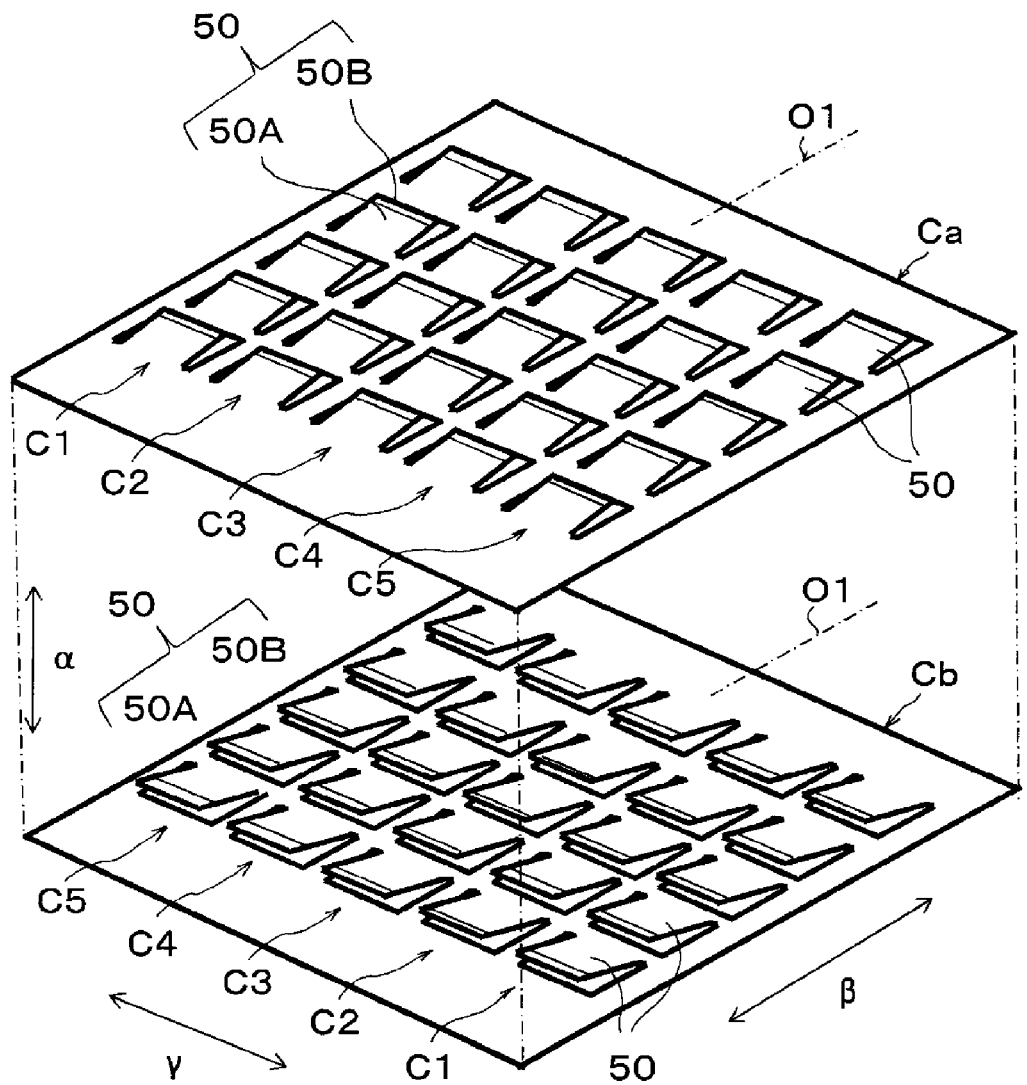
FIG. 5 is a perspective view of displacement absorbing members disposed in each of cooling fluid passage channels formed by partitioning above and below the cell unit.
Figure 6A:
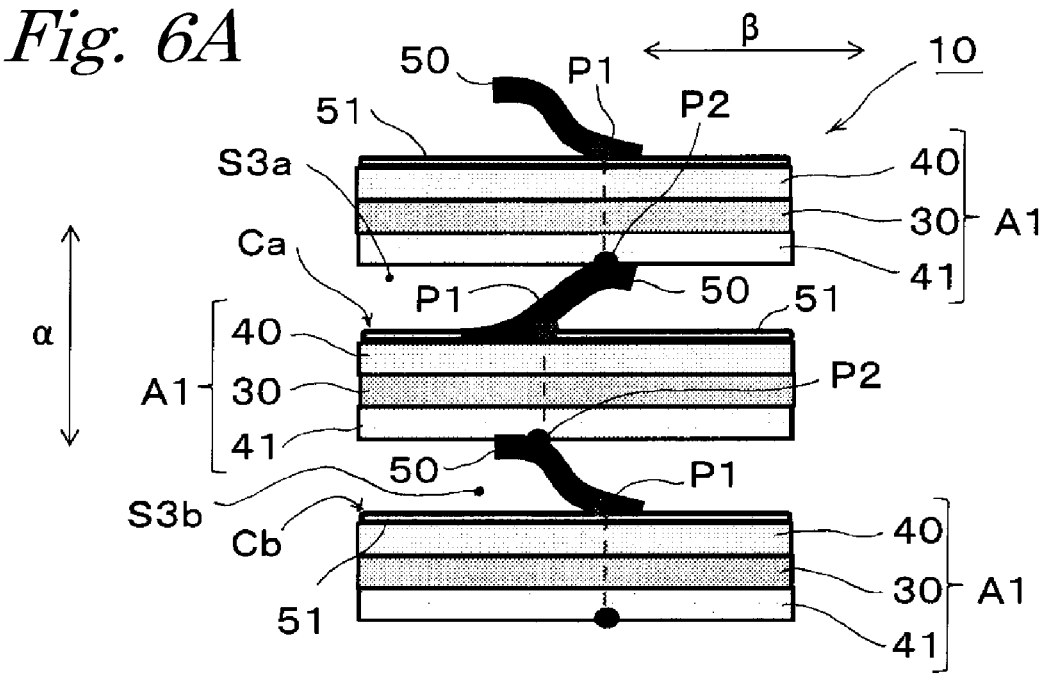
FIG. 6(A) is a partial cross sectional view of three cell units including the displacement absorbing members illustrated in FIG. 5 seen along a β direction.
Figure 6B:
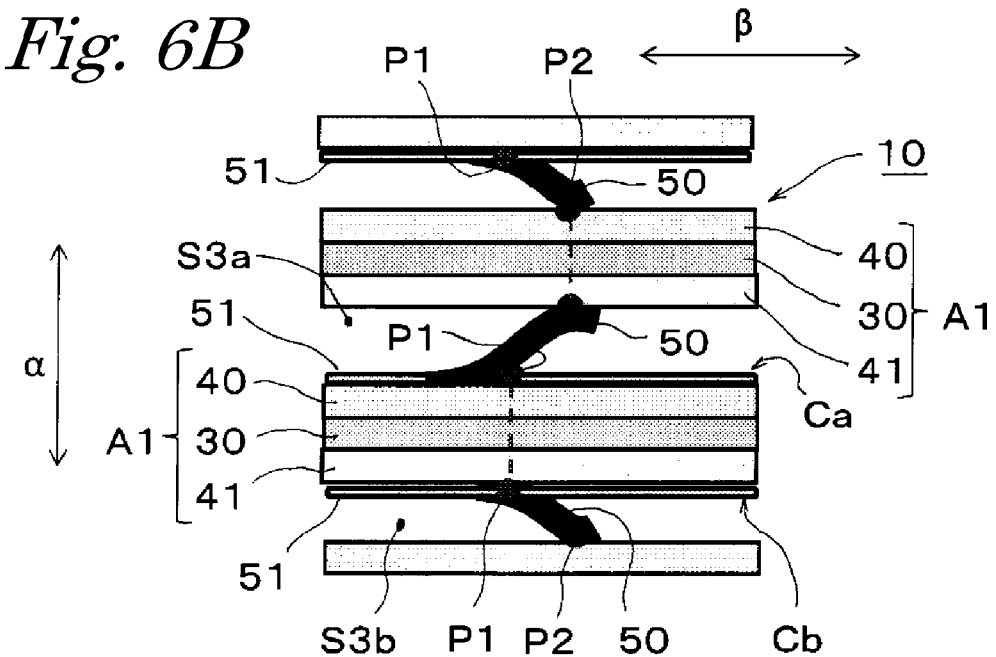
FIG. 6(B) is a partial cross sectional view illustrating another arrangement example of the displacement absorbing members.

FIG. 5 is a perspective view of the displacement absorbing members provided in each of the cooling fluid passage channels formed by partitioning above and below the cell unit, FIG. 6(A) is a partial cross sectional view seen along the β direction of three cell units including the displacement absorbing member illustrated in FIG. 5, and FIG. 6(B) is a partial cross sectional view illustrating another example of the displacement absorbing member.

In the fuel cell stack 10 of the embodiment, the cooling fluid passage channels S3a and S3b include displacement absorbing members Ca and Cb each having a plurality of displacement absorbing projections 50 that absorb displacement along the laminated direction α of the cell units A1. The displacement absorbing projections 50 of the displacement absorbing members Ca and Cb are arranged so as to cancel off any bending moments generated on the cell unit A1.

The displacement absorbing members Ca and Cb of the embodiment are identical to each other in structure, and the displacement absorbing member Cb is disposed in the cooling fluid passage channel S3b rotated 180 degrees in the flowing direction β of the cooling fluid with respect to the displacement absorbing member Ca disposed in the cooling fluid passage channel S3a. Cost reduction is performed by such a communization of components, however it is not limited to these measures. Described below is the displacement absorbing member Ca disposed in one of the cooling fluid passage channels S3a; and the displacement absorbing member Cb disposed in the other cooling fluid passage channel S3b will be allotted with identical reference signs and explanation thereof will be omitted.

As illustrated in FIG. 4 to FIG. 6, the displacement absorbing member Ca is a member including a plurality of displacement absorbing projections 50 integrally formed on a substrate 51 made of a conductive metal plate. The displacement absorbing projections 50 are disposed as projection rows that are arranged along a flowing direction β at regular intervals, and five projection rows C1 to C5 are provided at regular intervals along a direction γ intersecting at right angles to the flowing direction β. In this case, each of the displacement absorbing projections 50 is disposed at intervals corresponding to hill parts of the wave shape of the separators 40 and 41 as illustrated in FIG. 4, and as illustrated in FIG. 6, a base end load point P1 and a tip end load point P2 are aligned along the flowing direction β.

Although the present embodiment exemplifies five projection rows C1 to C5 for simple explanation, in practical use, a further more number of displacement absorbing projections 50 will be disposed horizontally and vertically.

The displacement absorbing projections 50 are inclined in one direction with respect to a flat plane that is parallel to a flowing direction β of the cooling fluid flowing inside the cooling fluid passage channel S3a, and are formed as plate bodies having the same shape and the same size.

The displacement absorbing projections 50 have a cantilever structure whose tip end serves as a free end and whose base end serves as a fixed end. The displacement absorbing projections 50 are shaped as a horizontally-long rectangle when seen along the flowing direction β, and are formed integrally by being cut out from the substrate 51.

Moreover, the displacement absorbing projections 50 are each formed of a coupling piece 50A inclined at a predetermined angle from the substrate 51 and a contacting piece 50B inclined at an angle shallower than that of the coupling piece 50A; the contacting piece 50B that serves as the free end elastically abuts with the cathode separator 41. The displacement absorbing projections 50 are arranged such that a plate face forming an acute angle is directed downwards of the flowing direction β.

Further, the fuel cell stack 10 includes the displacement absorbing member Ca provided in the cooling fluid passage channel S3a on the anode separator side of the cell unit A1 and the displacement absorbing member Cb provided in the cooling fluid passage channel S3b on the cathode separator side of the cell unit A1 so that corresponding load points of the displacement absorbing projections 50 of the displacement absorbing members Ca and Cb overlap each other in the laminated direction α of the cell unit A1.

In particular, in this embodiment, the base end side load points P1 of the displacement absorbing projections 50 in the displacement absorbing member Ca disposed in the cooling fluid passage channel S3a on the anode separator 40 side of the cell unit A1 and corresponding tip end side load points P2 of the displacement absorbing projections 50 in the displacement absorbing member Cb disposed in the cooling fluid passage channel S3b on the cathode separator 41 side of the cell unit A1 are arranged so as to overlap each other in the laminated direction α of the cell unit A1.

The base end side load points P1 of the displacement absorbing projections 50 indicate a load applied on the base ends of the displacement absorbing projections 50. Moreover, the tip end side load points P2 of the displacement absorbing projections 50 indicate a load applied on the tip ends of the displacement absorbing projections 50. The above expression of "load point" is an expression when seen along an orthogonal direction γ intersecting at right angles to the flowing direction β of the cooling fluid, and when seen along the flowing direction β, this will be a "load line", however both indicate the same meaning.

By arranging the displacement absorbing projections 50 as described above, the direction of the load applied on the base end side load points P1 of the displacement absorbing projections 50 of one of the displacement absorbing members Ca and the direction of the load applied on the tip end side load points P2 on the displacement absorbing projections 50 of the other displacement absorbing member Cb face each other and match along the laminated direction α. As a result, no bending moment is generated on the cell unit A1 disposed between the displacement absorbing members Ca and Cb.

The above displacement absorbing projections 50 can be formed as a microstructure by bending hemmed parts as a result of cutting processing such as punching or processing that accompanies removal of material such as etching.

The fuel cell stack 10 illustrated in FIG. 6(B) includes the displacement absorbing member Ca disposed in the cooling fluid passage channel S3a on the anode separator 40 side of the cell unit A1 upside down. In this case also, the direction of the load applied on the base end side load points P1 of the displacement absorbing projections 50 of one of the displacement absorbing members Ca and the direction of the load applied on the base end side load points P1 of the displacement absorbing projections 50 of the other displacement absorbing member Cb face each other and match along the laminated direction α. Moreover, the direction of the load applied on the tip end side load points P2 of the displacement absorbing projections 50 of one of the displacement absorbing members Ca and the direction of the load applied on the tip end side load points P2 of the displacement absorbing projections 50 of the other displacement absorbing member Cb face each other and match along the laminated direction α. As a result, no bending moment is generated on the cell units A1 disposed between the displacement absorbing members Ca and Cb.

Second Embodiment

FIG. 7(A) is a plan view of a displacement absorbing member according to a second embodiment, disposed in a cooling fluid passage channel on an anode separator side of the cell unit, and FIG. 7(B) is a plan view of a displacement absorbing member according to another example, disposed in a cooling fluid passage channel on a cathode separator side of the cell unit. The displacement absorbing member Cc according to the second embodiment differs in the form of alignment in the projection rows C1 to C6. Each of the projection rows C1 to C6 align five displacement absorbing projections 50a to 50e in one row along the flowing direction β.

In the displacement absorbing member Cc, measurements from a center line O1 to a respective base end side load point P1 and a respective tip end side load point P2 of displacement absorbing projections 50a to 50e disposed upstream or downstream along the flowing direction β are made equal to each other, wherein the center line O1 passes a position that bisects a displacement absorbing projection 50c disposed in the middle of the projection rows C1 to C6, between the base end side load point P1 and tip end side load point P2 of the displacement absorbing projection 50c, and the center line O1 is along a direction γ intersecting at right angles with the flowing direction β. Although the load points P1 and P2 are illustrated just partially in the displacement absorbing projections 50, they are of course present on all of the displacement absorbing projections 50.

More specifically, in a case in which a measurement from the center line O1 to the base end side load point P1 of the displacement absorbing projection 50*c* is L1, a measurement to the tip end side load point P2 of the displacement absorbing projection 50*c* is also set to L1. In a relationship between the displacement absorbing projection 50*b* and the displacement absorbing projection 50*d*, in a case in which a measurement from the center line O1 to the tip end side load point P2 of the displacement absorbing projection 50*b* is L2, a measurement from the center line O1 to the base end side load point P1 of the displacement absorbing projection 50*d* is set to L2. Moreover, in a case in which a measurement from the center line O1 to the base end side load point P1 of the displacement absorbing projection 50*b* is L3, a measurement from the center line O1 to the tip end side load point P2 of the displacement absorbing projection 50*d* is set to L3.

In a relationship between the displacement absorbing projection 50*a* and the displacement absorbing projection 50*e*, in a case in which a measurement from the center line O1 to the tip end side load point P2 of the displacement absorbing projection 50*a* is L4, a measurement from the center line O1 to the base end side load point P1 of the displacement absorbing projection 50*e* is set to L4. Moreover, in a case in which a measurement from the center line O1 to the base end side load point P1 of the displacement absorbing projection 50*a* is L5, a measurement from the center line O1 to the tip end side load point P2 of the displacement absorbing projection 50*e* is set to L5.

The displacement absorbing member Cc according to the above second embodiment is disposed in the cooling fluid passage channel S3a in a direction illustrated in FIG. 7(A), whereas in the cooling fluid passage channel S3b, the displacement absorbing member Cc is disposed in a state rotated by 180 degrees with respect to an in-plane direction, as illustrated in FIG. 7(B).

This thus allows for a direction of the load applied on the base end side load points P1 of the displacement absorbing projections 50 of the displacement absorbing member Cc disposed in one of the cooling fluid passage channels S3a and a direction of the load applied on the tip end side load points P2 of the displacement absorbing projections 50 of the displacement absorbing member Cc disposed in the other cooling fluid passage channel S3b to face each other and match along the laminated direction α, and no bending moment is generated on the cell unit A1 disposed between the displacement absorbing members Cc. Moreover, just one type of the displacement absorbing member Cc is used, which allows for reducing production costs.

Third Embodiment

Figure 8A:
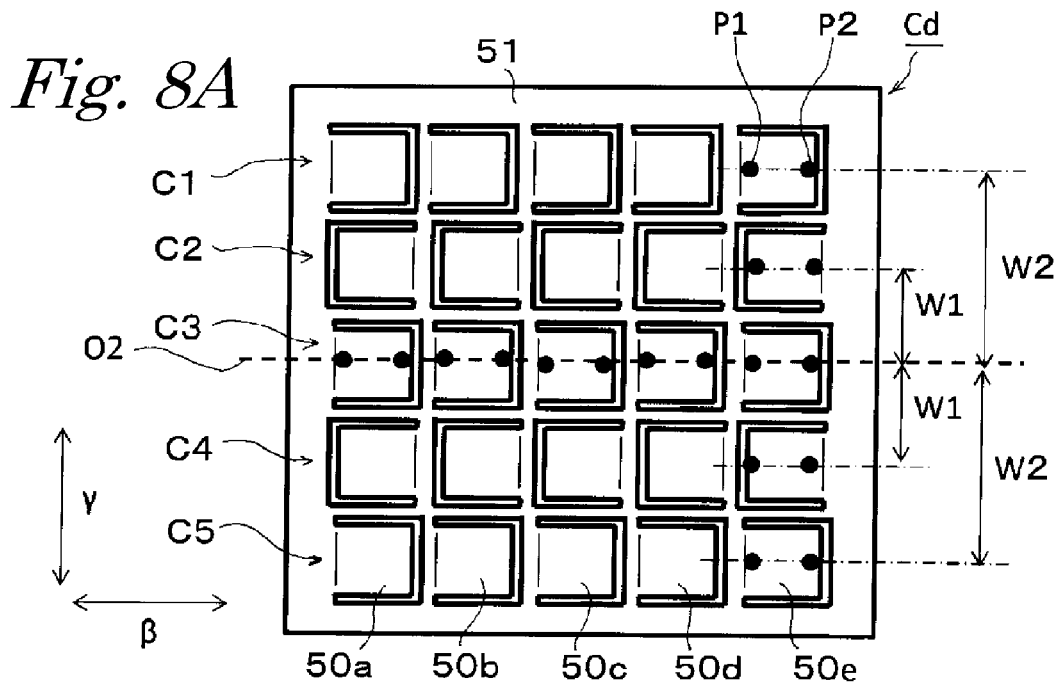
FIG. 8(A) is a plan view of a displacement absorbing member according to a third embodiment, disposed in a cooling fluid passage channel on an anode separator side of the cell unit.
Figure 8B:
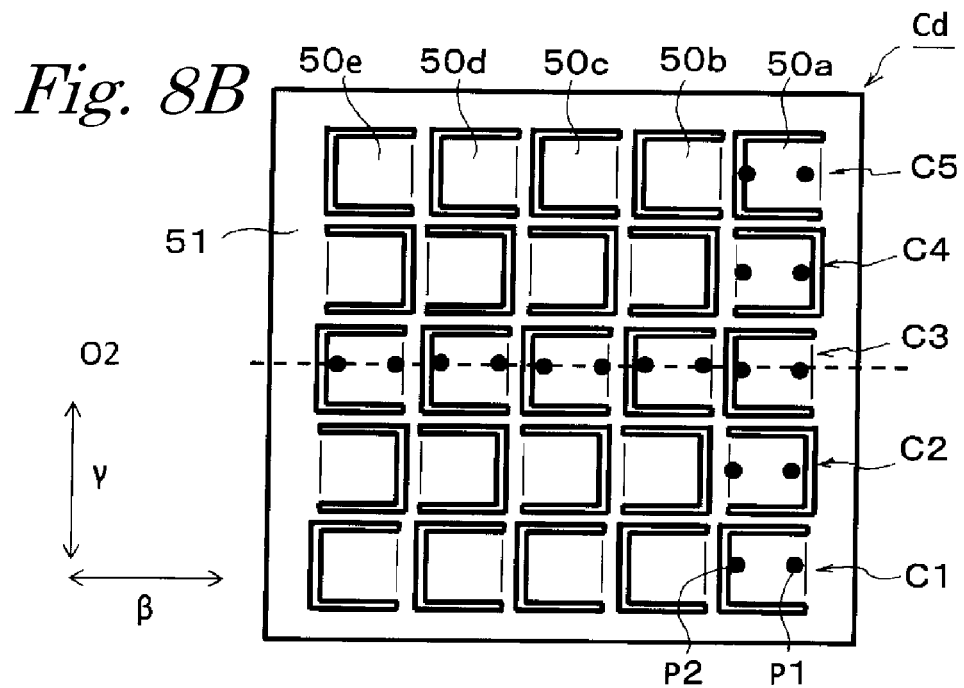
FIG. 8(B) is a plan view of a displacement absorbing member according to another example of the third embodiment, disposed in a cooling fluid passage channel on a cathode separator side of the cell unit.
Figure 9:
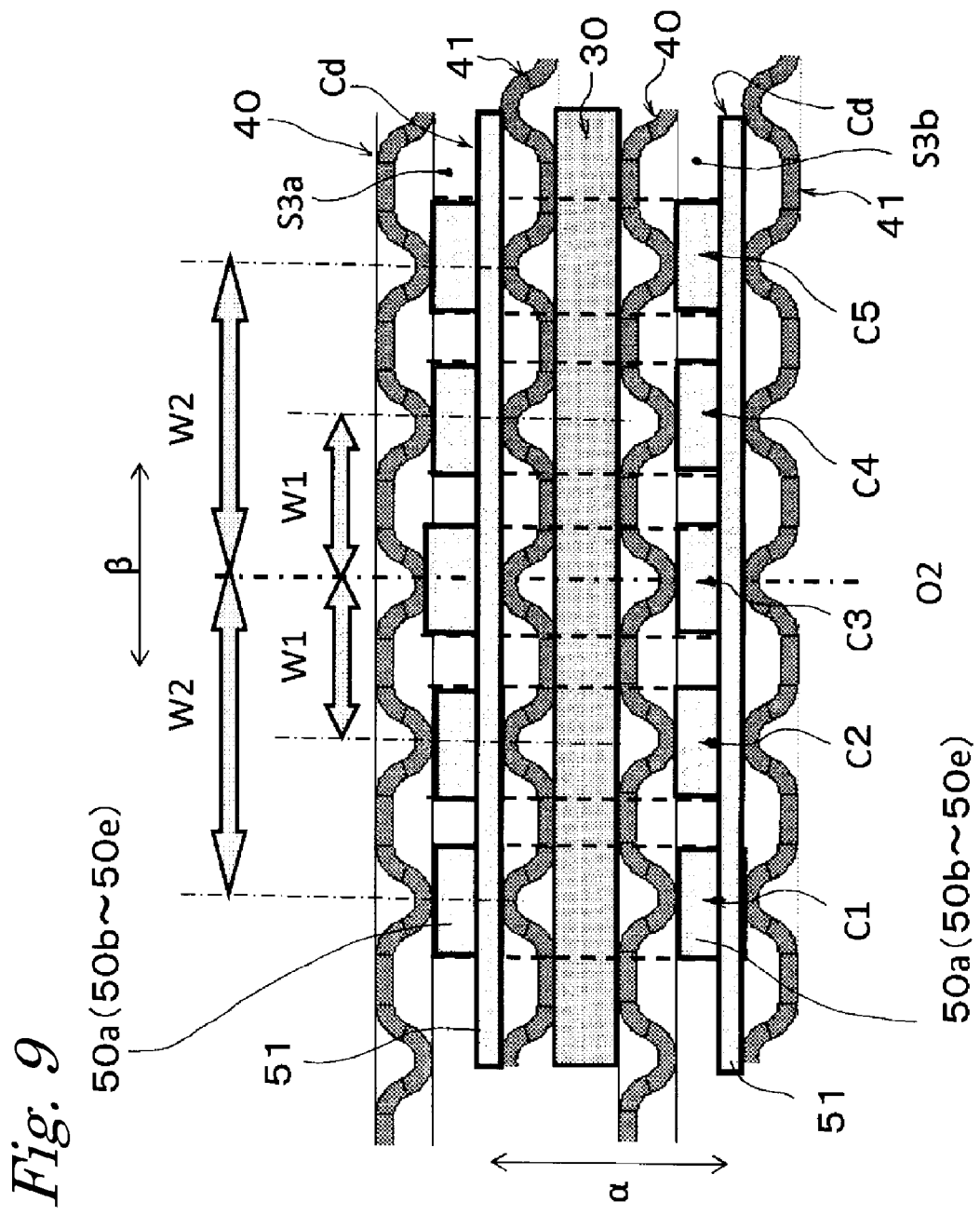
FIG. 9 is a partial enlarged cross sectional view illustrating a disposed state of the displacement absorbing member according to the third embodiment in a cooling fluid passage channel.

FIG. 8(A) is a plan view of a displacement absorbing member according to another example of a third embodiment, disposed in a cooling fluid passage channel on an anode separator side of a cell unit, and FIG. 8(B) is a plan view of a displacement absorbing member according to the third embodiment, disposed in a cooling fluid passage channel on a cathode separator side of a cell unit. FIG. 9 is a partial enlarged cross sectional view illustrating a disposed state of the displacement absorbing member according to the third embodiment in a cooling fluid passage channel.

A displacement absorbing member Cd according to the third embodiment differs in the form of alignment of the projection rows C1 to C5 from the above embodiments. Each of the projection rows C1 to C5 align five displacement absorbing projections 50*a* to 50*e* along the flowing direction β.

The illustrated displacement absorbing member Cd has the projection row C3 arranged in the middle of the projection rows C1 to C5, positioned on a center line O2 parallel to the flowing direction β, and has the other projection rows C2, C1, C4, and C5 disposed at even respective intervals W1 and W2 therefrom (see FIG. 9).

The displacement absorbing projections 50*a* to 50*e* forming the first projection row C1 illustrated on an upper side in the drawing of FIG. 8(A) are inclined in one direction with respect to a flat plane parallel to the flowing direction β of the cooling fluid flowing inside the cooling fluid passage channel S3a, and are formed as plate bodies having the same shape and the same size. The displacement absorbing projections 50*a* to 50*e* are arranged such that a plate face forming an acute angle is directed downwards of the flowing direction β.

The displacement absorbing projections 50*a* to 50*e* forming the second projection row C2 are inclined in an opposite direction to those of the first projection row C1 with respect to the flat plane parallel to the flowing direction β of the cooling fluid flowing inside the cooling fluid passage channel S3a, and are formed as plate bodies having the same shape and the same size. That is to say, the displacement absorbing projections 50*a* to 50*e* are arranged such that a plate face forming an acute angle is directed upwards of the flowing direction β.

In this embodiment, the displacement absorbing projections 50 in the rows of uneven numbers C1, C3, and C5 are inclined downwards from the flowing direction β, and the displacement absorbing projections 50 in the rows of even numbers C2 and C4 are inclined upwards from the flowing direction β.

Moreover, each of the base end side load points P1 and tip end side load points P2 of respective adjacent displacement absorbing projections 50*a* to 50*e* are arranged along one straight line, whose direction γ intersects at right angles to the flowing direction β.

The displacement absorbing member Cd according to the third embodiment described above is disposed in the cooling fluid passage channel S3a such that the displacement absorbing member Cd is directed as illustrated in FIG. 8(A). Meanwhile, another displacement absorbing member Cd having an identical configuration is disposed in the cooling fluid passage channel S3b such that the displacement absorbing member Cd is rotated by 180 degrees with respect to an in-plane direction, as illustrated in FIG. 8(B).

Accordingly, a direction of the load applied on the base end side load points P1 of the displacement absorbing projections 50 of the displacement absorbing member Cd disposed in one of the cooling fluid passage channels S3a and a direction of the load applied on corresponding tip end side load points P2 of the displacement absorbing projections 50 of the displacement absorbing member Cc disposed in the other cooling fluid passage channel S3b face each other and match along the laminated direction α, and no bending moment is generated on the cell unit A1 disposed between the displacement absorbing members Cc and Cd. Moreover, by having the inclining directions of the displacement absorbing projections 50 in opposite directions between the uneven rows C1, C3, and C5 and even rows C2 and C4, it is possible to minimize the deviation in the load along the flowing direction β.

Fourth Embodiment

Figure 10A:
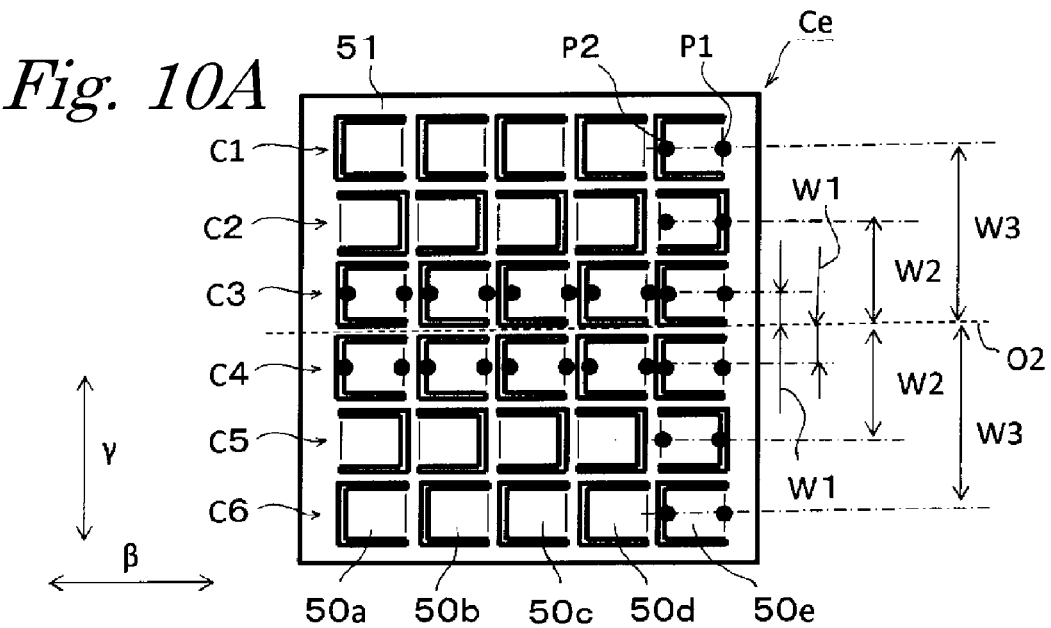
FIG. 10(A) is a plan view of a displacement absorbing member according to a fourth embodiment, disposed in a cooling fluid passage channel on an anode separator side of the cell unit.
Figure 10B:
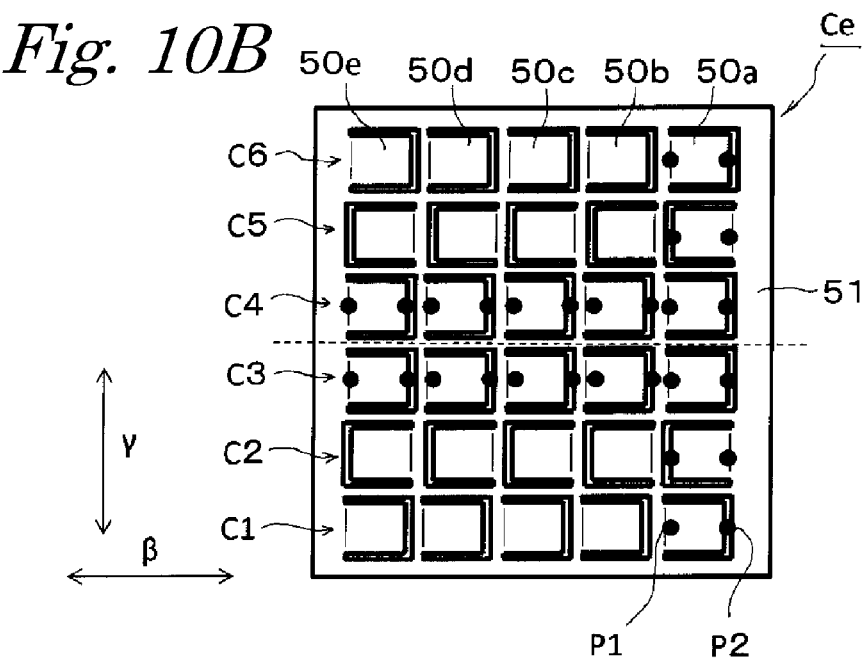
FIG. 10(B) is a plan view of a displacement absorbing member according to another example of the fourth embodiment, disposed in a cooling fluid passage channel on a cathode separator side of the cell unit.

FIG. 10(A) is a plan view of a displacement absorbing member according to a fourth embodiment, disposed in a cooling fluid passage channel on an anode separator side of a cell unit, and FIG. 10(B) is a plan view of a displacement absorbing member according to the fourth embodiment, disposed in a cooling fluid passage channel on a cathode separator side of a cell unit.

A displacement absorbing member Ce according to the fourth embodiment differs in the form of alignment of the projection rows C1 to C6 from the above embodiments. Each of the projection rows C1 to C6 aligns five displacement absorbing projections 50a to 50e in one row along the flowing direction β.

The displacement absorbing member Ce has, on either sides of the center line O2 parallel to the flowing direction β, the other projection rows C3, C2, and C1 and C4, C5, and C6 arranged at even intervals W1, W2, and W3, respectively.

The displacement absorbing projections 50a to 50e forming a first projection row C1 illustrated on an upper side in the drawing of FIG. 10(A) are inclined in one direction with respect to a flat plane parallel to the flowing direction β of the cooling fluid flowing inside one of the cooling fluid passage channels S3a, and are formed as plate bodies having the same shape and the same size. The displacement absorbing projections 50a to 50e are arranged such that a plate face forming an acute angle is directed upwards of the flowing direction β.

The displacement absorbing projections 50a to 50e forming the second projection row C2 are inclined in an opposite direction to those of the projection row C1 with respect to the flat plane parallel to the flowing direction β of the cooling fluid flowing inside the cooling fluid passage channel S3a, and are formed as plate bodies having the same shape and the same size. The displacement absorbing projections 50a to 50e are arranged such that a plate face forming an acute angle is directed downwards of the flowing direction β.

In this embodiment, the displacement absorbing projections 50 in the rows of uneven numbers C1, C3, and C5 are arranged such that a plate face forming an acute angle is directed upwards of the flowing direction β, and the displacement absorbing projections 50 of the rows of even numbers C2, C4, and C6 are arranged such that a plate face forming an acute angle is directed downwards of the flowing direction β.

Moreover, each of the base end side load points P1 and the tip end side load points P2 of adjacent displacement absorbing projections 50a to 50e are arranged along one straight line in an orthogonal direction γ.

The displacement absorbing member Ce according to the fourth embodiment is disposed in one of the cooling fluid passage channels such that the displacement absorbing member Ce is directed as illustrated in FIG. 10(A). Meanwhile, another displacement absorbing member Ce having an identical configuration is disposed in the other cooling fluid passage channel such that the displacement absorbing member Ce is rotated by 180 degrees with respect to an in-plane direction, as illustrated in FIG. 10(B).

Accordingly, as described above, a direction of the load applied on the base end side load points P1 of the displacement absorbing projections 50a to 50e of the displacement absorbing member Ce disposed in one of the cooling fluid passage channels S3a and a direction of the load applied on corresponding tip end side load points P2 of the displacement absorbing projections 50a to 50e of the displacement absorbing member Ce disposed on the other cooling fluid passage channel S3b face each other and match along the laminated direction α, and no bending moment is generated on the cell unit A1 disposed between the displacement absorbing members Ce, Ce.

Fifth Embodiment

Figure 11A:
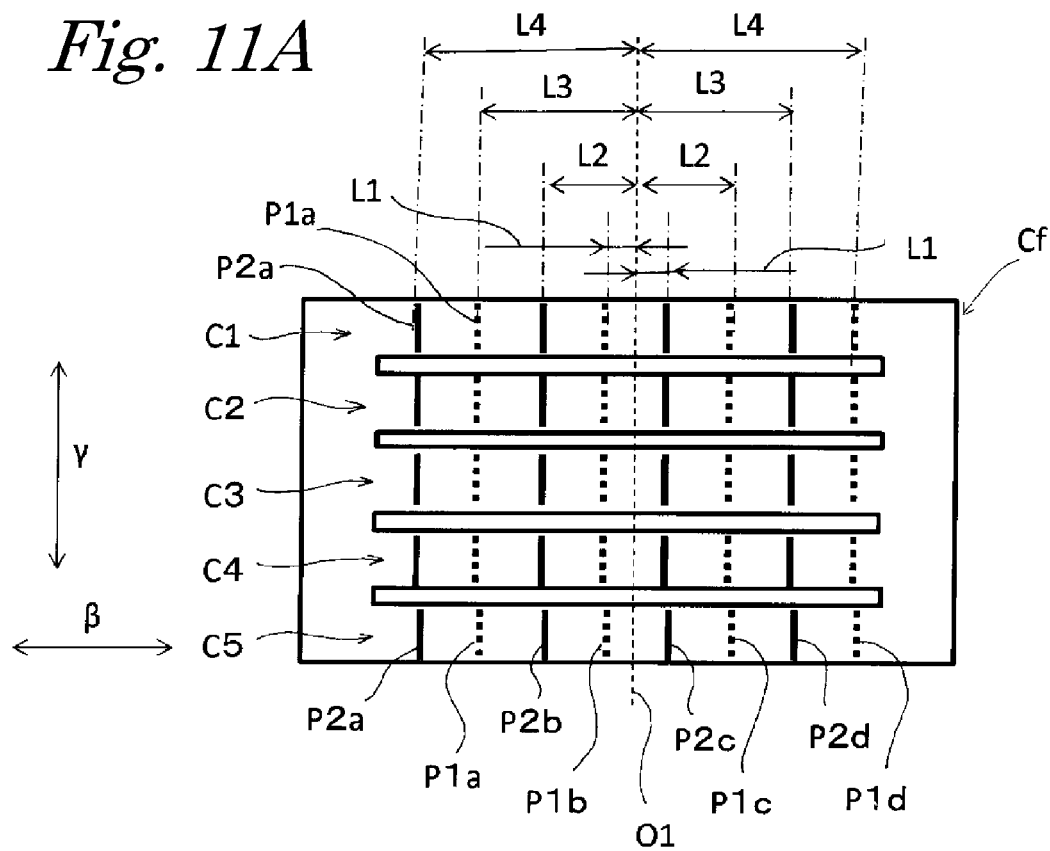
FIG. 11(A) is a plan view of a displacement absorbing member according to a fifth embodiment.
Figure 11B:
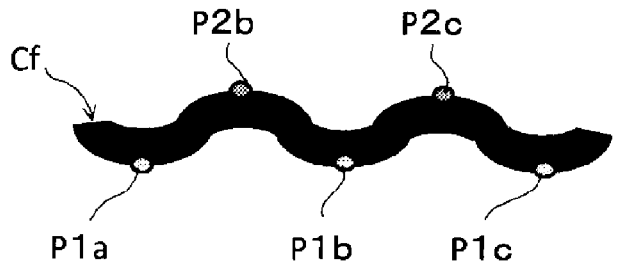
FIG. 11(B) is a partial enlarged view thereof.
Figure 12:
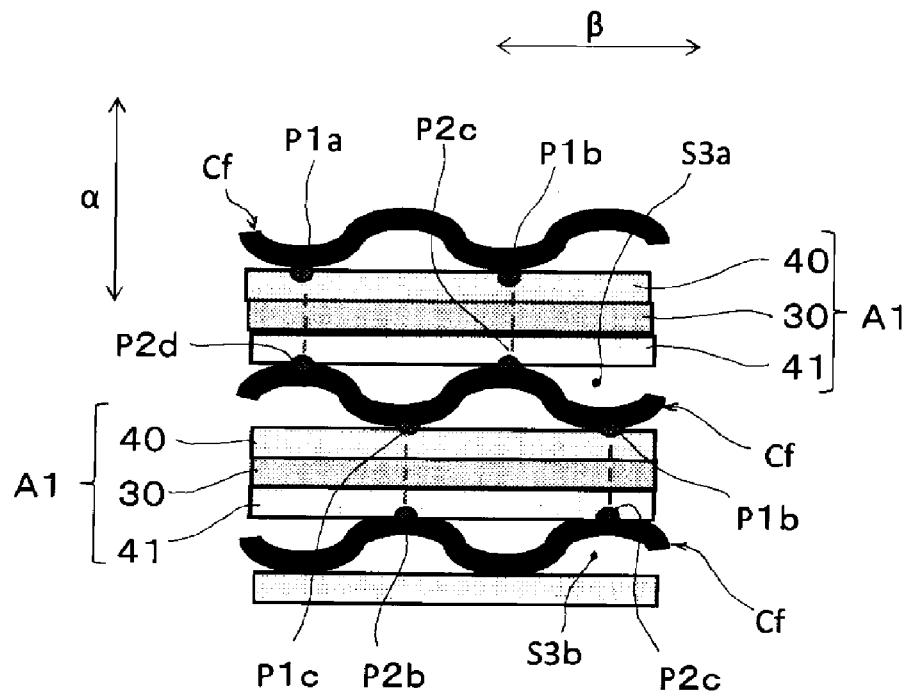
FIG. 12 is a partial enlarged view of the displacement absorbing member according to the fifth embodiment in a state disposed in a cooling fluid passage channel.

FIG. 11(A) is a plan view of a displacement absorbing member according to a fifth embodiment, and FIG. 11(B) is a partial enlarged view thereof. FIG. 12 is a partial enlarged view of the displacement absorbing member according to the fifth embodiment in a state disposed in a cooling fluid passage channel.

A displacement absorbing member Cf according to the fifth embodiment integrally forms projection rows C1 to C5 separately from each other on a substrate 51A made of a conductive metal plate. Each of the projection rows C1 to C5 are formed as a band form having a constant width equal to each other, and is formed in a concave-convex shape for example in a sine wave having four upper load points P2a to P2d and four lower load points P1a to P1d provided along a flowing direction β.

In the displacement absorbing member Cf, measurements L1 to L4 from a center line O1 to respective upper load points P2a to P2d and respective lower load points P1a to P1d disposed upstream and downstream along the flowing direction β are made equal to each other, wherein the center line O1 is parallel to the orthogonal direction γ described above at a position that bisects the upper load point P2c and the lower load point P1b disposed in the middle of the projection rows C1 to C5. In this embodiment, the upper load points P2a to P2d correspond to the tip end side load points described above, and the lower load point P1a to P1d correspond to the base end side load points.

More specifically, a measurement from the center line O1 to the upper load point P2c and a measurement from the center line O1 to the lower load point P1b is L1. Similarly, in a case in which a measurement from the center line O1 to the upper load point P2b is L2, a measurement from the center line O1 to the lower load point P1c is set to L2. Moreover, in a case in which a measurement from the center line O1 to the lower load point P1a is L3, a measurement from the center line O1 to the upper load point P2d is set to L3. Similarly, in a case in which a measurement from the center line O1 to the upper load point P2a is L4, a measurement from the center line O1 to the lower load point P1d is set to L4.

In other words, the upper load points P2a to P2d and the lower load points P1a to P1d that form each of the projection rows C1 to C5 are regularly spaced out along the flowing direction β, and are aligned to fabricate the projection rows C1 to C5. As illustrated in FIG. 6(A), each of the base end side load points P1 and the tip end side load points P2 in respective displacement absorbing projections 50 are aligned in one row in the flowing direction β. Moreover, the projection rows C1 to C5 are arranged regularly spaced from each other in a direction γ intersecting at right angles to the flowing direction β.

As illustrated in FIG. 12, the displacement absorbing member Cf according to the fifth embodiment is disposed inside one of the cooling fluid passage channels, meanwhile this displacement absorbing member Cf is disposed in the other cooling fluid passage channel in a state rotated by 180 degrees with respect to an in-plane direction.

As a result, a direction of the load applied on the lower load points P1a to P1d of the displacement absorbing member Cf disposed in one of the cooling fluid passage channels and a direction of the load applied on corresponding upper load points P2a to P2d of the displacement absorbing member Cf disposed in the cooling fluid passage channel S3b face each other and match the laminated direction α, and no bending moment is generated on the cell unit A1 disposed between the displacement absorbing members Cf, Cf.

Sixth Embodiment

Figure 13:
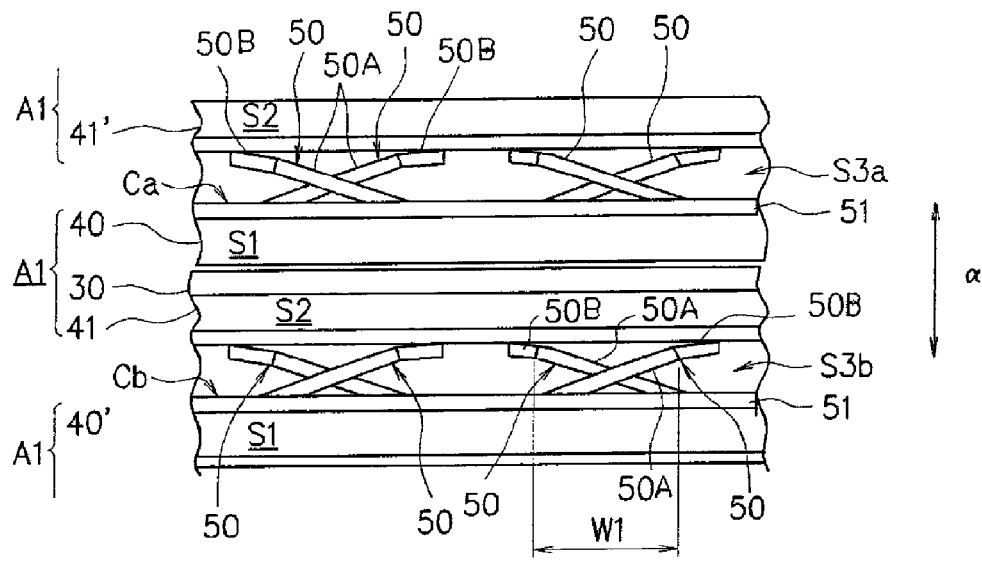
FIG. 13 is a partial cross sectional view of a cross section corresponding to one taken on the line I-I illustrated in FIG. 3.
Figure 14A:
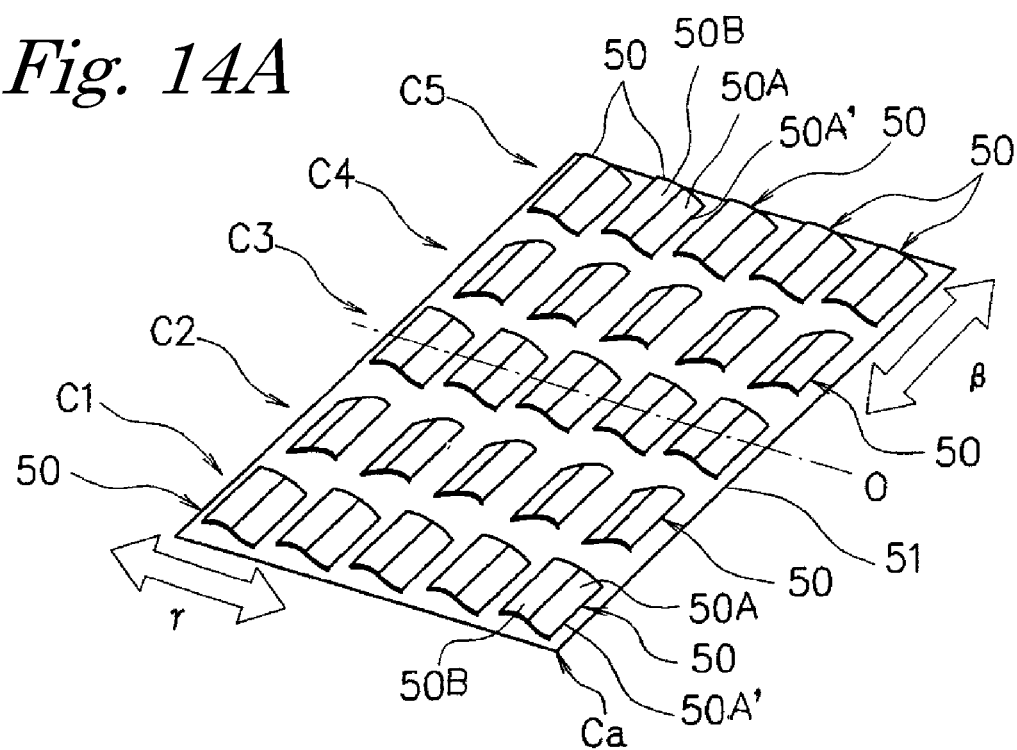
FIG. 14(A) is a perspective view of a displacement absorbing member disposed in a cooling fluid passage channel formed by partitioning between an anode separator of a cell unit and a cathode separator of another cell unit adjacent to the former cell unit.
Figure 14B:
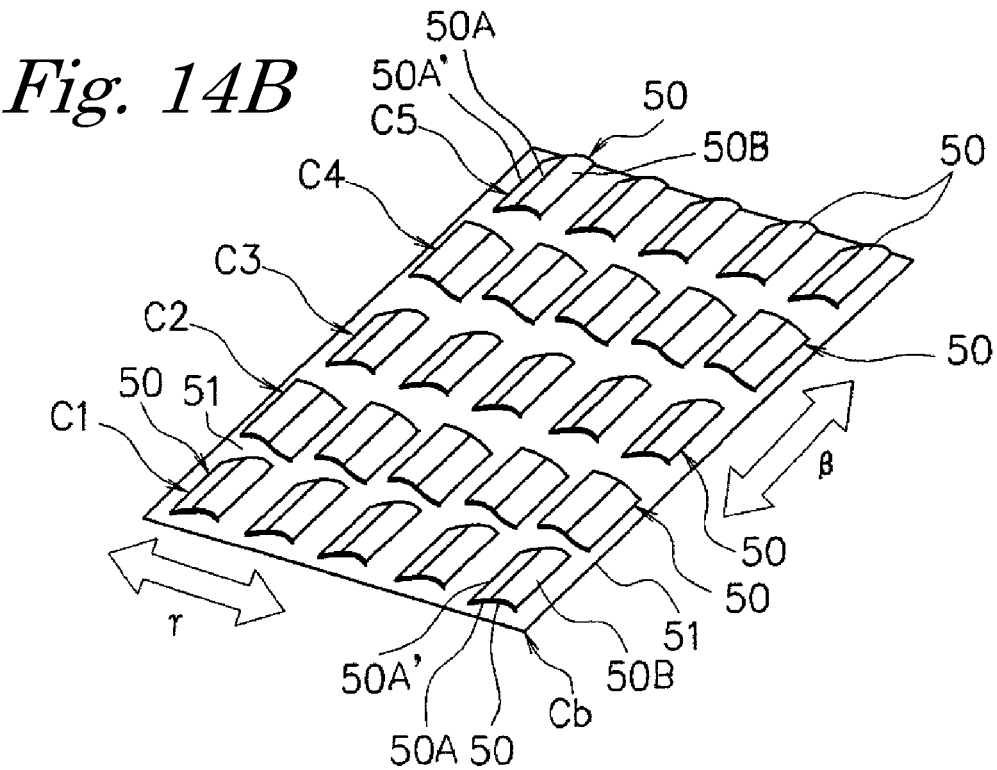
FIG. 14(B) is a perspective view of a displacement absorbing member disposed in a cooling fluid passage channel formed by partitioning between a cathode separator of a cell unit and an anode separator of another cell unit adjacent to the former cell unit.
Figure 15:
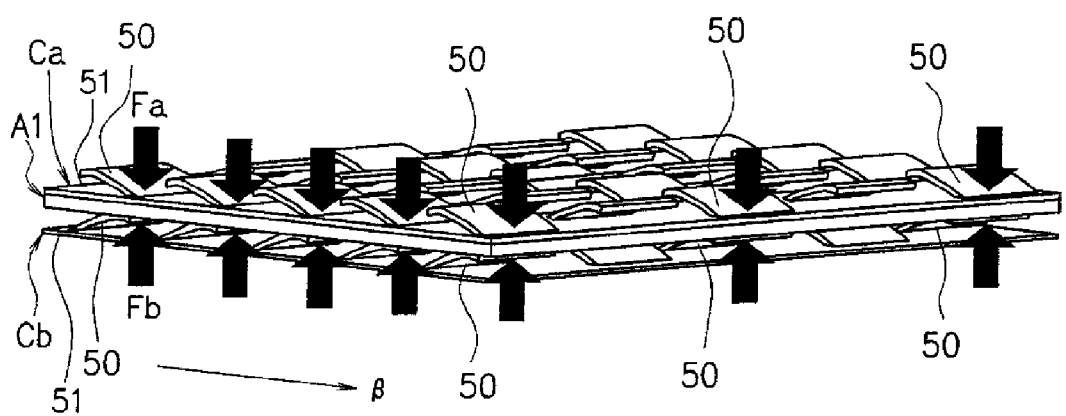
FIG. 15 is a perspective view for describing the load applied on displacement absorbing members disposed in two cooling fluid passage channels, respectively.

Next describes a displacement absorbing member according to a sixth embodiment, with reference to FIG. 13 to FIG. 15. FIG. 13 is a partial cross sectional view of a cross section corresponding to one taken on the line I-I illustrated in FIG. 3. FIG. 14(A) is a perspective view of a displacement absorbing member disposed in a cooling fluid passage channel formed by partitioning between an anode separator of a cell unit and a cathode separator of another cell unit adjacent to the former cell unit, and FIG. 14(B) is a perspective view of a displacement absorbing member disposed in a cooling fluid passage channel formed by partitioning between a cathode separator of a cell unit and an anode separator of another cell unit adjacent to the former cell unit.

Moreover, FIG. 15 is a perspective view for describing a load applied on displacement absorbing members disposed in two cooling fluid passage channels, respectively. Members equivalent to those described in the above embodiments will be allotted with the same reference signs, and descriptions thereof will be omitted.

As illustrated in FIG. 13, among the laminated three cell units A1, A1, A1, an anode separator 40 and a cathode separator 41 of the middle cell unit A1 are bonded liquid-tightly with a cathode separator 41' of the illustrated upper cell unit A1 and an anode separator 40' of the illustrated lower cell unit A1, respectively, to form cooling fluid passage channels S3a and S3b for allowing the cooling fluid to flow between the respective separators. The description below employs two identical displacement absorbing members Ca, Cb, however the present invention is not limited to this.

In this embodiment, a displacement absorbing member Ca disposed in a cooling fluid passage channel S3a on an anode separator 40 side of one of the cell units A1 and a displacement absorbing member Cb disposed in a cooling fluid passage channel S3b on a cathode separator 41' side of that cell unit A1 are disposed so that each of their displacement absorbing projections 50, 50 face each other and directions of loads applied on the displacement absorbing projections 50, 50 facing each other are directed to each other. The loads applied on the displacement absorbing projections 50, 50 are the loads applied in the laminated direction α of the cell unit A1.

The displacement absorbing members Ca, Cb have identical configurations as described above; the following description describes one disposed in one of the cooling fluid passage channels S3a, and the other disposed in the other cooling fluid passage channel S3b is allotted with identical reference signs and explanation thereof will be omitted.

The displacement absorbing member Ca is a member in which a plurality of projection rows C1 to C5 arranged in a flowing direction β of a cooling fluid flowing inside one of the cooling fluid passage channels S3a are arranged at regular intervals along an orthogonal direction γ intersecting at right angles to the flowing direction β, as illustrated in FIG. 14(A). In the present embodiment, five projection rows represented by C1 to C5 are exemplified for simple explanation.

Each of the projection rows C1 to C5 include a plurality of displacement absorbing projections 50 aligned at regular intervals along the orthogonal direction γ, which projections are formed integrally on a substrate 51 made of a conductive metal plate. The "regular intervals" are set to be the same as a width W1 of the displacement absorbing projections 50, 50 or wider (see FIG. 13), however is not limited to this.

The displacement absorbing projections 50 of the illustrated first, third and fifth projection rows C1, C3, and C5, are inclined in one direction in the orthogonal direction γ intersecting at right angles to the flowing direction β of the cooling fluid flowing inside the cooling fluid passage channel S3a, and are formed as plate bodies having the same shape and the same size.

The displacement absorbing projections 50 are shaped as a horizontally-long rectangle when seen along the direction γ intersecting at right angles to the flowing direction β and are inclined in horizontally opposite directions when seen along the flowing direction β. The displacement absorbing projections 50 are formed integrally by being cut out from the substrate 51.

The displacement absorbing projections 50 are each formed of a coupling piece 50A inclined at a predetermined angle from the substrate 51 and a contacting piece 50B inclined at an angle shallower than that of the coupling piece 50A; the contacting piece 50bB that serves as a free end elastically abuts with the cathode separator 41'. The displacement absorbing projections 50 are arranged such that a plate thick face is directed at right angles to the flowing direction β.

As illustrated in FIG. 13 and FIG. 15, the displacement absorbing member Ca is disposed in the cooling fluid passage channel S3a such that the substrate 51 is abutted to the anode separator 40 and the contacting piece 50b of the displacement absorbing projection 50 is elastically in contact with the cathode separator 41'.

On the other hand, the displacement absorbing projections 50 forming the second and fourth projection rows C2 and C4 are inclined in an opposite direction to the former displacement absorbing projections 50 forming the projection rows C1, C3, and C5, along the flowing direction β of the cooling fluid flowing inside the cooling fluid passage channel S3a, and are formed as plate bodies having the same shape and the same size. The displacement absorbing projections 50 are shaped as a horizontally long rectangle when seen along the orthogonal direction γ, and are formed integrally by being cut out from the substrate 51. It is the same as the above in that the displacement absorbing projections 50 are arranged directed at right angles to the flowing direction β.

The projection rows C1 to C5 described above are disposed symmetrical to the center line in the direction γ intersecting at right angles to the flowing direction β, having the center line O2 serving as a center thereof. The third projection row C3 disposed in the middle of the projection rows C1 to C5 is positioned on the center line O2 parallel to the orthogonal direction γ, and the other projection rows C2, C1 and C4, C5 are disposed at regular intervals W1 and W2, respectively.

The displacement absorbing member Cb disposed in the other cooling fluid passage channel S3b is identical to the displacement absorbing member Ca disposed in the cooling fluid passage channel S3a described above, however it is disposed in a state rotated by 180 degrees with respect to the flowing direction β of the cooling fluid.

In other words, as illustrated in FIG. 14(B), the displacement absorbing member Ca disposed in the cooling fluid passage channel S3a on the anode side of the cell unit A1 and the displacement absorbing member Cb disposed on the other cooling fluid passage channel S3b are disposed so that corresponding displacement absorbing projections 50 of the displacement absorbing members Ca, Cb face each other, and contacting parts of the displacement absorbing projections 50, 50, that face each other, with the respective separators 41' are directed in an opposite direction with respect to the flowing direction β of the cooling fluid.

Furthermore, a direction of the load applied on the base end side load points P1 of the displacement absorbing projections 50 of the displacement absorbing member Ca disposed in one of the cooling fluid passage channels S3a and a direction of the load applied on corresponding tip end side load points P2 of the displacement absorbing projections 50 of the displacement absorbing member Cb disposed in the cooling fluid passage channel S3b face each other and match the laminated direction α. Accordingly, no bending moment is generated on the cell unit A1 disposed between the displacement absorbing members Ca, Cb.

As from the above arrangement, a direction of a load Fa applied downwards on a base part 50a' of the coupling piece 50a of the displacement absorbing projections 50 of the displacement absorbing member Ca and a direction of a load Fb applied upwards on the contacting pieces 50b of the displacement absorbing projections 50 of the displacement absorbing member Cb disposed in the cooling fluid passage channel S3b match the laminated direction α, as illustrated in FIG. 15. Moreover, a direction of the load applied upwards on the contacting pieces 50b of the displacement absorbing projections 50 of the displacement absorbing member Ca and a direction of the load applied downwards on the base part 50a' of the coupling pieces 50a of the displacement absorbing projections 50 of the displacement absorbing member Cb match the laminated direction α.

The fuel cell stack 10 of the above embodiments can achieve the following effects. That is to say, in a fuel cell stack 10 in which a plurality of cell units A1 are laminated, the cell units including a membrane electrode assembly 30 sandwiched between two separators 40 and 41, and in which cooling fluid passage channels S3a and S3b are formed between each adjacent cell units A1 for flowing cooling fluid, displacement absorbing members Ca to Cf having a plurality of displacement absorbing projections 50 that absorb displacement in a laminated direction of the cell unit A1 are disposed in the cooling fluid passage channels S3a and S3b and the displacement absorbing projections 50 of the displacement absorbing members Ca to Cf are disposed such that any bending moments generated on the cell unit A1 is canceled out. This thus allows for preventing the generation of any bending moment on the cell unit A1 and prevents any damages caused on the cell unit A1 in advance.

Moreover, by disposing the displacement absorbing member Ca disposed in the cooling fluid passage channel S3a on an anode separator side of the cell unit A1 and the displacement absorbing member Cb disposed in the cooling fluid passage channel S3b on a cathode separator side of the same cell unit A1 so that the load points of respective displacement absorbing projections 50 overlap each other in the laminated direction of the cell unit A1, directions of loads at both load points face each other and match the laminated direction α. This thus prevents any bending moment from generating on the cell unit A1 that is disposed between the displacement absorbing members Ca and Cb.

Furthermore, by disposing the displacement absorbing members so that the base end load points P1 applied on the base ends of the displacement absorbing projections 50 of the displacement absorbing member Ca disposed in the cooling fluid passage channel S3a on the anode separator side of the cell unit A1 and corresponding tip end side load points P1 applied on the tip ends of the displacement absorbing projections 50 of the displacement absorbing member Cb disposed in the cooling fluid passage channel S3b on the cathode separator side of the same cell unit A1 overlap each other along the laminated direction of the cell unit A1, the directions of the load on both the load points P1 and P2 face each other and match the laminated direction α; this thus can prevent any bending moment from generating on the cell unit A1 disposed between the displacement absorbing members Ca and Cb.

Furthermore, the above effect can be achieved by devising the directions and arrangement of the displacement absorbing projections 50 on the displacement absorbing members Ca to Cf, and by arranging the identical displacement absorbing members in different directions, in particular, by disposing the displacement absorbing projections 50 symmetrical to the center line in the direction γ intersecting at right angles to the flowing direction β of the cooling fluid. This thus allows for reducing the number of components used, thus reducing production costs and the like.

In addition, by disposing the displacement absorbing projections 50 so as to face opposite directions, the loads generated are directed in opposite directions. This allows for preventing any bending moment from generating on the entire displacement absorbing member. Furthermore, the displacement absorbing projections 50 are formed separately from each other, thus allowing for preventing any influence from any surrounding displacement absorbing projections. The displacement absorbing projections 50 are further formed as plate bodies, and are arranged such that a plate thick face thereof is directed at right angles with respect to the flowing direction β. This not only achieves the effect of preventing the bending moment, but also can further improve the flowability of the cooling fluid.

Furthermore, the displacement absorbing projections 50 are formed integrally by being cut out from the substrate 51; no process is required such as to separately form a projected part and bond that to a substrate, which thus allows for easy production. Moreover, since there is no bonded part and the like, strength is more easily secured in marginal parts of the displacement absorbing projections 50, that are in contact with the substrate 51 at the marginal parts, compared with the case in which the projections are formed by bonding. This improves reliability thereof.

The above description explains the present invention in detail, however the present invention is not limited to the arrangement described in the above embodiments; details of the arrangement can be modified as appropriate within a range that does not exceed the gist of the present invention.

The invention claimed is:
1. A fuel cell stack comprising:
a plurality of laminated cell units, each cell unit comprising a membrane electrode assembly sandwiched between two separators;
a cooling fluid passage channel for allowing cooling fluid to flow formed between separators of respective adjacent cell units; and a displacement absorbing member in each cooling fluid passage channel having a plurality of displacement absorbing projections that absorb displacement of the cell unit along a laminated direction, wherein the displacement absorbing member has a planar base and the displacement absorbing projections are cut from the planar base and extend from only one surface of the planar base, the displacement absorbing projections of the displacement absorbing member are disposed to cancel out a bending moment generated on the cell unit, the displacement absorbing projections positioned in the displacement absorbing member to be in straight rows intersecting at right angles with a flowing direction.

2. The fuel cell stack according to claim 1, wherein the displacement absorbing member disposed in the cooling fluid passage channel on an anode separator side of the cell unit and the displacement absorbing member disposed in the cooling fluid passage channel on a cathode separator side of the same cell unit are disposed so that load points of the displacement absorbing projections of those displacement absorbing members overlap in the laminated direction of the cell units.

3. The fuel cell stack according to claim 1, wherein a base end load point applied on a base end of the displacement absorbing projection of the displacement absorbing member disposed in the cooling fluid passage channel on an anode separator side of the cell unit and a tip end side load point applied on a tip end of the displacement absorbing projection of the displacement absorbing member disposed in the cooling fluid passage channel on a cathode separator side of the same cell unit are disposed to overlap each other in the laminated direction of the cell units.

4. The fuel cell stack according to claim 1, comprising an uneven number of projection rows, each projection row having a plurality of the displacement absorbing projections arranged in one row, wherein
among the projection rows, a middle projection row is disposed on a center line parallel to a flowing direction of the cooling fluid, and distances between load points applied on the displacement absorbing projections of the projection row disposed on the center line and load points applied on the displacement absorbing projections of the projection rows disposed parallel to the projection row disposed on the center line are the same.

5. The fuel cell stack according to claim 1, comprising an uneven number of projection rows, each projection row having an uneven number of the displacement absorbing projections arranged in one row, wherein
among the displacement absorbing projections, middle displacement absorbing projections are disposed on a center line intersecting at right angles to a flowing direction of the cooling fluid, and tip end side load points applied on tip ends of the displacement absorbing projections positioned on a upstream side of the flowing direction with respect to the center line and base end side load points applied on base ends of the displacement absorbing projections positioned on a downstream side of the flowing direction with respect to the center line are disposed symmetrical to the center line.

6. The fuel cell stack according to claim 1, comprising an uneven number of projection rows, each projection row having a plurality of the displacement absorbing projections arranged in one row, wherein
among the projection rows, a middle projection row is disposed on a center line parallel to a flowing direction of the cooling fluid, and the projection rows on both sides that sandwich the center line are disposed symmetrical to the center line.

7. The fuel cell stack according to claim 1, comprising an even number of projection rows, each projection row having a plurality of the displacement absorbing projections arranged in one row, wherein
the projection rows are disposed on both sides that sandwich the center line parallel to a flowing direction of the cooling fluid, and the projection rows are disposed symmetrical to the center line.

8. The fuel cell stack according to claim 6, wherein the displacement absorbing projections of the two innermost projection rows sandwiching the center line are inclined in the same direction, and the displacement absorbing projections of the projection rows positioned outer of the innermost projection rows are inclined in different directions alternately per row.

9. The fuel cell stack according to claim 1, wherein the displacement absorbing projections are disposed in an inverted manner in an up-and-down direction alternately per adjacent cooling fluid passage channel.

10. The fuel cell stack according to claim 1, wherein the displacement absorbing projections are aligned in a plural number of rows in an inclined manner along directions intersecting with each other,
contacting parts of the displacement absorbing projections that face each other with each of the separators are disposed in an opposite direction in a flowing direction of the cooling fluid or in a direction intersecting at right angles to the flowing direction of the cooling fluid.

11. The fuel cell stack according to claim 1, wherein the displacement absorbing projections are formed separately from each other.

12. The fuel cell stack according to claim 10, wherein the displacement absorbing projection is formed as a plate body, and is arranged such that a plate thick face thereof is directed at right angles to the flowing direction of the fluid.

13. The fuel cell stack according to claim 10, wherein the displacement absorbing projections inclined in a direction intersecting with each other with respect to a flat plane intersecting with the flowing direction of the cooling fluid are disposed alternately along the flowing direction.

* * * * *